(12) United States Patent
Saumweber et al.

(10) Patent No.: US 9,609,811 B2
(45) Date of Patent: Apr. 4, 2017

(54) METHOD AND SYSTEM FOR UTILIZING HEAT IN A PLANT OR ANIMAL GROWING DEVICE, AND GREENHOUSE

(75) Inventors: Philipp Christian Saumweber, London (GB); Reinier Rudy Wolterbeek, Port Augusta (AU)

(73) Assignee: SUNDROP FARMS HOLDINGS LIMITED, Douglas (IM)

( * ) Notice: Subject to any disclaimer, the term of this patent is extended or adjusted under 35 U.S.C. 154(b) by 149 days.

(21) Appl. No.: 14/239,766

(22) PCT Filed: Aug. 3, 2012

(86) PCT No.: PCT/IB2012/001493
§ 371 (c)(1),
(2), (4) Date: Apr. 15, 2014

(87) PCT Pub. No.: WO2013/027097
PCT Pub. Date: Feb. 28, 2013

(65) Prior Publication Data
US 2014/0245661 A1    Sep. 4, 2014

(30) Foreign Application Priority Data

Aug. 19, 2011    (AU) ................................ 2011213783

(51) Int. Cl.
*A01G 9/24*    (2006.01)
*A01K 1/00*    (2006.01)
(Continued)

(52) U.S. Cl.
CPC .............. *A01G 9/14* (2013.01); *A01G 9/243* (2013.01); *A01G 25/167* (2013.01);
(Continued)

(58) Field of Classification Search
CPC .......... A01G 9/243; A01G 9/245; A01G 9/24; A01G 25/167; A01K 1/0076; A01K 63/065; Y02P 60/124
(Continued)

(56) References Cited

U.S. PATENT DOCUMENTS 3,669,184 A * 6/1972 Franzreb .................. A01G 9/24
126/271.1
4,333,736 A * 6/1982 Shachar ............... B01D 9/0031
23/295 S
(Continued)

FOREIGN PATENT DOCUMENTS

AU    WO 2013027097 A1 *  2/2013 ............. A01G 9/243
DE    3612188 A1 * 10/1987 ............. A01G 9/243
(Continued)

OTHER PUBLICATIONS

International Search Report for PCT/EPIB2012/001493, issued on Jan. 3, 2013.

*Primary Examiner* — Gregory Huson
*Assistant Examiner* — Daniel E Namay
(74) *Attorney, Agent, or Firm* — Andrews Kurth Kenyon LLP

(57) ABSTRACT

A method for utilizing heat in a plant or animal growing device includes circulating a heat transfer fluid through a circuit forming a closed fluid loop, heating the heat transfer fluid by a heat source, supplying heat from the heat transfer fluid to a first heat user which may be a thermal desalination unit, and returning at least part of the heat transfer fluid that has been cooled down. The heat transfer fluid supplies heat to at least one additional heat user serially arranged before or after the thermal desalination unit. The temperature ranges of the heat transfer fluid are within the optimal operating temperature ranges of the respective heat users in
(Continued)

the fluid circuit. A corresponding system and greenhouse by which the method of the invention may be implemented is also described.

29 Claims, 2 Drawing Sheets

(51) Int. Cl.
    *A01K 63/06*     (2006.01)
    *A01G 25/16*     (2006.01)
    *A01G 9/14*     (2006.01)
    *F24D 12/02*     (2006.01)

(52) U.S. Cl.
    CPC .......... *A01K 1/0076* (2013.01); *A01K 63/065* (2013.01); *Y02P 60/124* (2015.11)

(58) Field of Classification Search
    USPC ................................ 237/81, 8 A, 12, 14, 13
    IPC .............. A01G 9/24,25/16; A01K 1/00, 63/06; F24D 12/02
    See application file for complete search history.

(56) References Cited

U.S. PATENT DOCUMENTS

| | | | | |
|---|---|---|---|---|
| 4,340,036 A * | 7/1982 | Williams | ............... | A01G 9/243 126/620 |
| 4,437,263 A * | 3/1984 | Nir | ............... | A01G 9/243 47/1.01 R |
| 4,462,334 A * | 7/1984 | Kim | ............... | A01K 31/00 119/436 |
| 5,188,288 A * | 2/1993 | DeMerritt | ............... | A01G 9/245 126/91 A |
| 5,433,759 A * | 7/1995 | Benson | ............... | A01B 45/02 405/43 |
| 6,000,170 A * | 12/1999 | Davis | ............... | A01G 9/225 47/17 |
| 2008/0131830 A1* | 6/2008 | Nix | ............... | F24D 5/00 432/220 |
| 2010/0019053 A1* | 1/2010 | Toland | ............... | F24D 3/02 237/63 |
| 2010/0236164 A1* | 9/2010 | Chuang | ............... | A01G 9/243 52/173.3 |
| 2010/0276502 A1* | 11/2010 | Beckett | ............... | F24D 19/1015 237/8 A |
| 2010/0313874 A1* | 12/2010 | Verey | ............... | A01G 9/243 126/643 |
| 2012/0174478 A1* | 7/2012 | Chen | ............... | A01G 9/243 47/17 |
| 2012/0247013 A1* | 10/2012 | Sung | ............... | A01G 7/02 47/39 |
| 2012/0312885 A1* | 12/2012 | Tomlinson | ............... | F24F 11/053 237/12 |
| 2013/0284818 A1* | 10/2013 | Hayashida | ............... | F24D 3/18 237/56 |
| 2014/0245661 A1* | 9/2014 | Saumweber | ............... | A01G 9/243 47/17 |
| 2016/0007577 A1* | 1/2016 | Constantz | ............... | A01K 61/00 119/245 |
| 2016/0057943 A1* | 3/2016 | Im | ............... | A01G 9/245 47/17 |

FOREIGN PATENT DOCUMENTS

| | | | | |
|---|---|---|---|---|
| DE | WO 9947856 A1 * | 9/1999 | ............... | A21B 1/40 |
| EP | 1 071 317 | 1/2001 | | |
| FR | 3005498 A1 * | 11/2014 | ............... | A01G 9/243 |
| GB | 2466500 A * | 6/2010 | ............... | A01G 9/24 |
| JP | 05260857 A * | 10/1993 | | |
| JP | 11235130 A * | 8/1999 | | |
| NL | WO 9839963 A1 * | 9/1998 | ............... | A01G 9/24 |
| NO | WO 2008097163 A1 * | 8/2008 | ............... | A01G 9/243 |
| WO | WO 99/53745 | 10/1999 | | |
| WO | WO2009/044623 | 4/2009 | | |

* cited by examiner

METHOD AND SYSTEM FOR UTILIZING HEAT IN A PLANT OR ANIMAL GROWING DEVICE, AND GREENHOUSE

FIELD OF INVENTION

The present invention relates to a method and system for utilizing heat in a plant or animal growing device, and a greenhouse.

BACKGROUND INFORMATION

Plant or animal growing devices, such as greenhouses, and artificial water ponds for growing fish and cattle farms, are in use all over the world. In such devices, energy in the form of heat is used by several heat users, such as a heating unit, that serves to provide an adequate temperature of the medium in which the specific type of plant or animal grows (typically air or water). The heat source may obtain its energy in any manner, typically by burning fossil fuel or by catching solar power. The heat users may vary according to the geographical circumstances, such as the availability of fresh water or seawater. For example, one of the heat users may be a thermal desalination unit, in locations where seawater is abundant and fresh water is scarce.

European Patent No. EP 1 071 317 describes a greenhouse and a heat source for producing steam comprising at least one collector situated above rotatable mirrors which can follow the movement of the sun according to the seasons and can make the top-side of the greenhouse practically light-tight. The water, in the form of steam, produced in the collector is distributed to two heat users, in a ratio determined by valves, and flows, after condensation, back to the heat source. The two heat users are (1) a thermal desalination unit and (2) a steam turbine, for producing electricity. The produced desalinated water is used for growing plants in the greenhouse. Part of the solar radiation enters the inner space of the greenhouse, where it is used for photosynthesis of plants.

SUMMARY

The method and device described above do not use the energy of the heat source in an optimal manner. An objective of the present invention is to provide a method and device which make more efficient use of the energy of the heat source.

According to an example embodiment of a method and device of the present invention, by adding at least one additional heat user in a serial arrangement of the heat users, it becomes possible to arrange the heat users in such a manner that the heat transfer fluid arriving at them has a temperature within an efficient operating range of each of the heat users, without having to dump or otherwise degrade, or diminish, the usability of the heat in the heat transfer fluid. As a result, the method offers a more efficient use of the heat from the heat source in that, for example, the heat in the heat transfer fluid can be used more efficiently, i.e. less heat can be thrown away (to the environment) or reduced in quality or usability by mixing it with colder fluids. This may be understood, for example, by comparing the serial arrangement to a parallel arrangement of the heat users: in a serial arrangement, the full temperature difference, or, in an analogy to an electrical circuit, the full heat "potential", is used for each heat user, although most heat users will operate only in their most efficient manner when operated at a subrange of said full temperature difference. By arranging the heat users serially, and in an appropriate order, they optimally use the heat in the fluid. This includes optimal use of the exergy, i.e., the amount of energy that can be withdrawn from the heat transfer fluid with respect to the conditions (such as temperature, pressure, electrical potential) of the environment it operates in. Advantageously, a thermal desalination device may allow such an optimal arrangement with a number of other heat users. Heating by the fluid is to be understood to include, in particular, flowing the fluid through the component as well as flowing the fluid through a heat exchanger that is thermally connected to the component.

Further, since more efficient use is made of the heat source, a smaller heat source will suffice. As a result, lower investment costs become possible for a device that has the same growing capacity.

Furthermore, supply of heat to a heat user may also be indirect, such as via a heat exchanger or via a secondary medium in a circuit and two heat exchangers.

In an embodiment according to a method and device of the present invention, the heat transfer fluid temperature ranges in the heat users are within the optimal operating temperature ranges of the respective heat users in the fluid circuit and, for all heat users in the closed fluid circuit, the heat fluid outlet temperature of one component, whether a heat user or the heat source, equals the heat fluid inlet temperature of the next component. In this manner, the heat produced in the heat source may be fully used in the heat users, without heat being dumped outside the heat users.

In another embodiment according to a method and device of the present invention, the additional heat user is a heating device of the medium where the plants or animals grow, in particular a crop heating or space heating in which the heat transfer fluid in operation is cooled down further from a starting temperature equal to or lower than the outlet temperature of the thermal desalination unit. In this manner, the thermal desalination unit and the crop or space heating may make efficient use of the available heat, due to their aligned operating temperatures.

In another embodiment according to a method and device of the present invention, the additional heat user is a salt production device producing salt from the brine created in the thermal desalination unit in which the heat transfer fluid in operation is cooled down further from a starting temperature equal to or lower than the outlet temperature of the thermal desalination unit. This may be another energy efficient arrangement, of two components that in practice are often used together, in order to make both fresh water and brine from seawater and to simultaneously make salt from the brine. The fresh water then may be used in the plant or animal growing device, and the salt may be either used or sold.

Alternatively, or in addition, the additional heat user may be a steam cycle machine, in particular an organic rankine cycle machine, in which the heat transfer fluid in operation is cooled down from a starting temperature lower than or equal to the outlet temperature of the heat source to a temperature lower than or equal to the inlet temperature of the thermal desalination unit. A steam cycle machine, especially an organic rankine cycle machine may be, among other applications, useful for producing electricity, or for producing mechanical power that may be used for fresh water production in a reverse osmosis process (e.g., a desalination process driven by mechanical pressure). In combination with the thermal desalination unit, it not only makes efficient use of the heat from the heat source, but also serves to provide electricity for the plant or animal growing device. This is in particular the case when the heat source is a solar driven heat source, for example driven by concentrated solar power. With a solar driven heat source using concentrated solar power, temperatures of up to 400 degrees Centigrade may be obtained e.g., temperatures at which it is possible to drive an organic rankine cycle machine running on an appropriately selected organic working medium. Furthermore, a thermal desalination unit, in an example embodiment, operates relatively efficiently at heat transfer fluid inlet temperatures of about 90-120 degrees Centigrade, temperatures typically available at the outlet of an organic rankine cycle fed at around 50-300 degrees Centigrade.

In another embodiment according to a method and device of the present invention, at least part of the heat in the circuit is temporarily stored in a heat buffer and then used in at least one of the heat users. This may be particularly useful when one or more heat users temporarily do not need any heat; the heat from the heat source, or from another heat user upstream from the specific heat user(s) temporarily not used, or used at a reduced power, may then be stored until it is needed. Moreover, by using a buffer, temporary peak demands from a heat user may be accommodated for. This provides a method that is more efficient than when a heat user is simply by-passed.

In a further embodiment according to a method and device of the present invention, the heat source is a solar driven heat source, in particular utilizing concentrated solar power. Such heat sources combine well with thermal desalination units in the circuit, with respect to thermodynamic efficiency.

In a further embodiment according to a method and device of the present invention, a vertical buffer tank is present, and a natural temperature gradient arises in the vertical direction, due to temperature-related density differences in the fluid.

In addition, a direct fluid communication may occur in which fluid communication between two components, being heat sources or heat users, without passing other heat sources or heat users (valves and tubes are not regarded as heat sources or heat users).

In a further embodiment according to a method and device of the present invention, in a greenhouse, a serial arrangement of a thermal desalination device with other heat users, in particular the heating of the air in the greenhouse and possibly an organic rankine cycle and/or a salt production device, make a high energy efficiency possible. Moreover, it becomes possible to obtain a lower cost price of the system.

Exemplary embodiments of the present invention will now be described with reference to the accompanying drawings.

DETAILED DESCRIPTION

Figure 1:
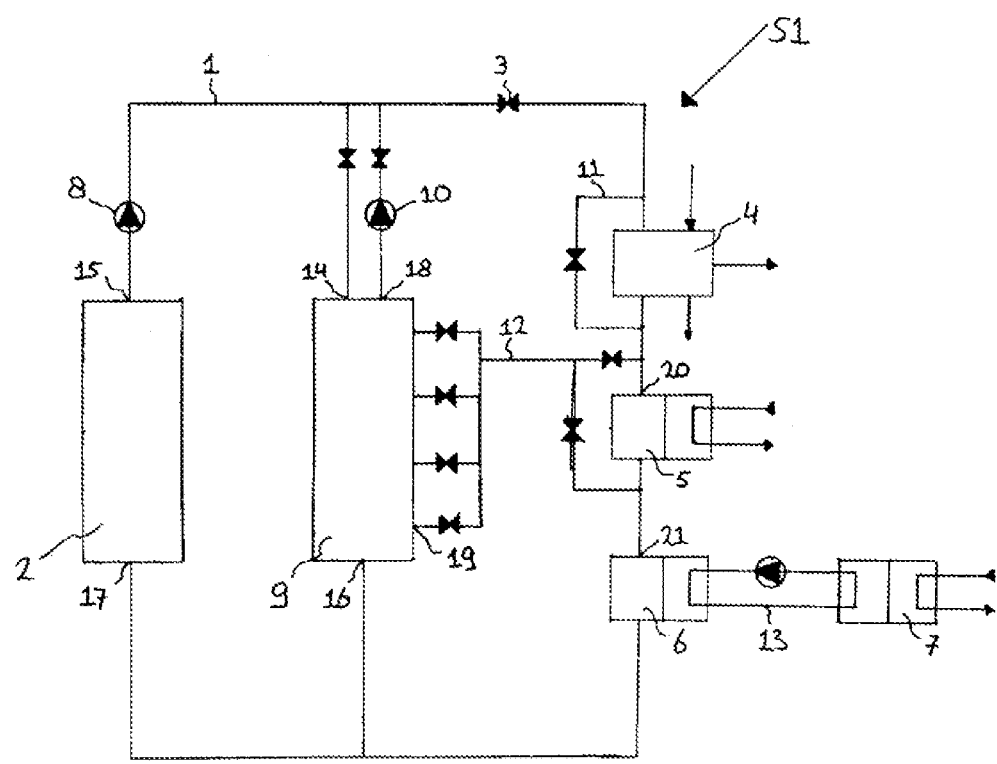
FIG. 1 schematically shows a first embodiment of the system according to the invention.

An exemplary embodiment of a system S1, S2 which is part of a greenhouse for growing plants of the present invention is described with reference to FIGS. 1 and 2.

The system S1 includes tubes, or piping, 1 represented by lines. The system S1 also contains a solar collector 2 that makes use of optical mirrors (not shown) to concentrate incident solar rays on a fluid line, and as such, to heat the fluid in the fluid line of the solar collector. The solar collector 2 is part of a fluid loop which includes the tubes 1, valves 3, a thermal desalination unit 4, a salt production unit 5, a heat exchanger 6 for a greenhouse air space heating 7 and an electrical pump 8. Arranged parallel to the line with the solar collector 2 and the pump 8 is a line with a heat buffer tank 9 and a pump 10. Line 11 is a bypass line for the thermal desalination unit 4. Line 12, between the buffer tank 9 and the salt production unit 5, connect the buffer tank 9 with the salt production unit 5 and the heat exchanger 6. The heat exchanger 6 is part of a second fluid loop 13, which loop 13 serves as a thermal connection between the heat exchanger 6 and the space heating 7 of the greenhouse.

The salt production unit 5 may be a multi stage flash unit, with an operating temperature between 70 and 110 degrees Centigrade. Alternatively, it may be a high performance salt production device with plastic heat exchangers that may have a slightly lower operating temperature, or it may be an open salt pond which may have an even lower operating temperature, where water evaporates from brine, and salt remains.

The buffer tank 9 is a vertical tank, of which a fluid inlet 14 is located at its top end and connected to the heat source outlet 15. A fluid outlet 16 of the buffer tank 9 is located at its bottom end and connected to the heat source inlet 17. The vertical buffer tank 9 has one fluid outlet 18 at its top end, connected via pump 10 to the thermal desalination unit 4, and has four fluid outlets 19 connected to inlets 20 and 21 of the salt production unit 5 and the heat exchanger 6, respectively. Each of the fluid outlets 19 is located at a different height between the top and bottom ends of the buffer tank 9, allowing for different take-off temperatures at the different fluid outlets 19 when a vertical temperature gradient is present within the buffer tank 9.

In the method according to an example embodiment of the present invention of system S1, a heat transfer fluid, such as glycol, is circulated through the heat users, in a serial arrangement, i.e., one after the other, i.e. through the thermal desalination unit 4, the salt production unit 5, and the heat exchanger 6 of the greenhouse air space heating 7.

The fluid is heated in the solar collector 2, to a temperature of up to 400 degrees Centigrade, then, in normal operation mode, passes through the heat exchanger of the thermal desalination unit 4, giving heat to that unit.

The fluid leaves the heat exchanger at around 70-110 degrees Centigrade, and enters the salt production unit 5, cools down further and continues to the heat exchanger 6 at a temperature between 50-90 degrees Centigrade. It returns to the solar collector 2 at a temperature between 20-70 degrees Centigrade, where it starts a new cycle through the fluid circuit.

It is possible to change the described normal operation mode to other operation modes, by, e.g., closing and opening valves 3 and activating or stopping pumps 8 and 10.

Via tubes 1 and pump 10 heat transfer fluid may be tapped from the buffer tank 9 and may be fed to the thermal desalination unit 4. This may be useful when the solar collector 2 may not be providing enough heat and/or provides heat at inadequate temperatures for the thermal desalination unit 4 to operate or to operate optimally, for instance, during nighttime conditions.

Via tubes 12 the buffer tank 9 may be tapped at different heights, and the tapped fluid may be mixed with the fluid from the solar collector 2 entering either the salt production unit 5 or the heat exchanger 6. This may temporarily lead to some loss of exergy, but may make it possible to operate these two heat users within their allowed temperature ranges, and thus, to operate the whole system S1, without having the need for a backup system. Moreover, adding fluid from the buffer tank 9, may allow for driving the heat users at their optimal temperature ranges, with respect to life expectancy and/or energy efficiency, thereby saving either investment costs or energy costs, or both.

A bypass tube 11 allows for bypassing of the thermal desalination unit 4, for instance when the thermal desalination unit 4 may be subject to maintenance operations.

Figure 2:
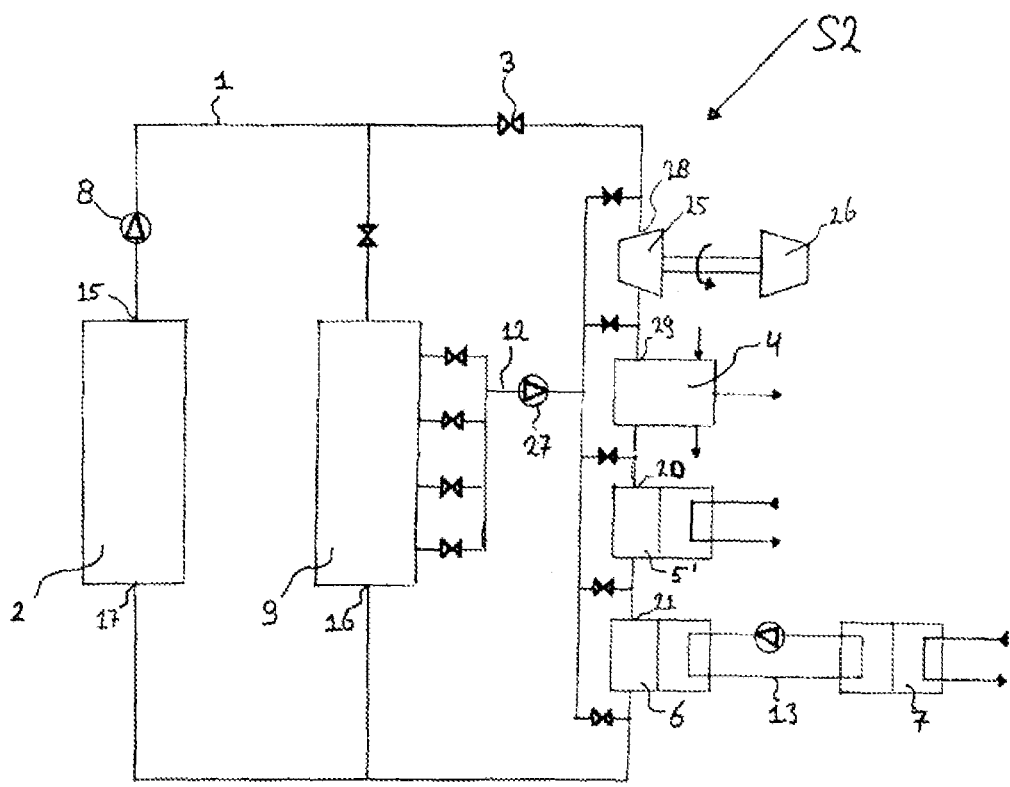
FIG. 2 schematically shows a second embodiment of the system according to the invention.

FIG. 2, shows the system S2, which is similar to the system S1 of FIG. 1 but has an additional heat user, in the form of a turbine 25 of an organic rankine cycle. The heat exchanger of the thermal desalination unit 4 serves as the condenser of the organic rankine cycle; thus, the cycle is integrated in the fluid circuit of system S2. The turbine 25 is mechanically coupled to a generator 26 of electricity.

Salt production unit 5' is a high-performance salt production device with plastic heat exchangers, operating at lower temperatures than the multistage flash unit 5 of FIG. 1.

Pump 10 of system S1 is replaced by pump 27 integrated in tubes 12' connecting the buffer tank 9 to an inlet 20, 21, 28, 29 of each of the heat users.

In the method according to an example embodiment of the present invention of system S2, a heat transfer fluid, e.g., an organic fluid with a high molecular mass and a boiling point below that of water in the atmosphere, is circulated through the heat users, i.e. through the organic rankine cycle turbine 25, thermal desalination unit 4, the salt production unit 5, and the heat exchanger 6 of the greenhouse air space heating 7. The fluid is heated and evaporated in the solar collector 2, to a temperature up to 400 degrees Centigrade, then, in normal operation mode, passes through the turbine 25 of the organic rankine cycle, where it may lose energy, in terms of both pressure and heat, while driving the generator 26 and thereby producing electricity for the greenhouse climate control equipment (fans, pumps, etc.) and other electrical equipment. Next, the fluid enters at a temperature between 90-130 degrees Centigrade, a heat exchanger of the thermal desalination unit 4 and condenses while giving heat to the desalination unit 4. The fluid leaves the heat exchanger between 70-110 degrees Centigrade, and enters the salt production unit 5', cools down further and continues to the heat exchanger 6 at a temperature between 50-90 degrees Centigrade. It returns to the solar collector 2 at a temperature between approximately 20-70 degrees Centigrade, where it starts a new cycle through the fluid circuit.

It is possible to change the described normal operation mode to other operation modes, by, e.g., closing and opening valves 3 and activating or stopping pumps 8 and 27.

Via tubes 12' the buffer tank 9 may be tapped at different heights, and the tapped fluid may be mixed with the fluid from the solar collector 2 entering any of the heat users. The reasons for doing so are described above with respect to system S1.

Not shown in FIG. 2, are bypass tubes in each of the heat users. These bypass tubes may allow the system S2 to operate when one of the heat users may temporarily not be used, e.g. because there may be no heat demand or during maintenance activities. Alternatively, the tubes 12' may be used as bypass tubes.

Also not shown in FIGS. 1 and 2, is an additional heat source, operating on fossil fuel and arranged in parallel and or series to the solar collector 2. This additional heat source provides heat at moments when the demand is higher than the solar collector 2 is capable of supplying.

The described and shown embodiments of the invention serve for illustration of the invention. Variations on these embodiments are possible. For example, a buffer container may be interposed between two heat users, instead of between the outlet and inlet of the heat source. Also, a heat user may be composed of a heat exchanger with an attached second fluid circuit as a closed loop that comprises two or more heat users, for example, in order to be able to apply different fluid pressures in each of the fluid loops. This is in particular useful for keeping the organic rankine cycle in FIG. 2 as a separate loop, fed by a heat exchanger through which the heat transfer fluid from the solar collector 2 flows.

The invention claimed is:

1. A method for utilizing heat in a plant or animal growing device, comprising:
    circulating a heat transfer fluid through a circuit forming a closed fluid loop;
    heating, via a heat source, the heat transfer fluid in the fluid circuit;
    supplying heat from the heat transfer fluid to a first heat unit including a thermal desalination unit in the fluid circuit, the first heat unit cooling down at least part of the heat transfer fluid; and
    returning the cooled down part of the heat transfer fluid to the heat source in the fluid circuit,
    wherein the heat transfer fluid supplies heat to at least one additional heat unit, the at least one additional heat unit connected between and in serial arrangement with the first heat unit before or after the first heat unit.

2. The method according to claim 1, wherein:
    temperature ranges of the heat transfer fluid within a respective heat unit are within optimal operating temperature ranges of the respective heat unit; and
    a heat fluid outlet temperature of one of the respective heat unit and the heat source equals a heat fluid inlet temperature of a following one of the respective heat unit and the heat source.

3. The method according to claim 1, wherein the additional heat unit is a heating device of a medium of the plant or animal growing device, and wherein the heat transfer fluid is cooled down further to a temperature equal to or lower than an outlet temperature of the thermal desalination unit.

4. The method according to claim 3, wherein the heating device includes a crop heating device and/or a space heating device.

5. The method according to claim 1, wherein the additional heat unit includes a salt production device for producing salt from brine created in the thermal desalination unit, and wherein the heat transfer fluid is cooled down further to a temperature equal to or lower than an outlet temperature of the thermal desalination unit.

6. The method according to claim 1, wherein the additional heat unit includes a steam cycle machine, and wherein the heat transfer fluid is cooled down from a starting temperature lower than or equal to an outlet temperature of the heat source to a temperature lower than or equal to an inlet temperature of the thermal desalination unit.

7. The method according to claim 6, wherein the steam cycle machine includes an organic rankine cycle machine.

8. The method according to claim 1, wherein at least part of the heat transfer fluid is temporarily stored in a heat buffer for later use in at least one of the heat units.

9. The method according to claim 1, wherein the heat source includes a solar driven heat source which is driven by concentrated solar power.

10. The method according to claim 1, wherein the additional heat unit includes a heating device of a medium of the plant or animal growing device, a salt production device for producing salt from brine created in the thermal desalination unit, and/or a steam cycle machine.

11. The method according to claim 10, wherein at least part of the heat transfer fluid is temporarily storable in a heat buffer for later use in at least one of the heat units, wherein the heat buffer includes a vertical tank, and wherein the vertical tank includes:
a fluid inlet disposed at a top end of the vertical tank and connected to an outlet of the heat source;
at least one heat transfer fluid take-off outlet disposed at a bottom end of the vertical tank and connected to an inlet of the heat source; and
at least one fluid outlet connected to an inlet of a respective additional heat unit.

12. The method according to claim 1, wherein at least part of the heat transfer fluid is temporarily storable in a heat buffer for later use in at least one of the heat units, wherein the heat buffer includes a vertical tank, and wherein the vertical tank includes:
a fluid inlet disposed at a top end of the vertical tank and connected to an outlet of the heat source;
at least one heat transfer fluid take-off outlet disposed at a bottom end of the vertical tank and connected to an inlet of the heat source; and
at least one fluid outlet connected to a respective inlet of the additional heat unit.

13. The method according to claim 1,
the first heat unit having an efficient operating range;
the additional heat unit having an efficient operating range;
wherein, if the additional heat unit is connected before the first heat unit,
heating, via the heat source, the heat transfer fluid to a temperature within the efficient operating range of the additional heat unit;
supplying heat from the heat transfer fluid to the additional heat unit, the additional heat unit cooling down at least part of the heat transfer fluid to a temperature within the efficient operating range of the first heat unit; and
supplying the heat transfer fluid from the additional heat unit to the first heat unit.

14. The method according to claim 1,
the first heat unit having an efficient operating range;
the additional heat unit having an efficient operating range;
wherein, if the additional heat unit is connected after the first heat unit,
the heating step further comprising heating, via the heat source, the heat transfer fluid to a temperature within the efficient operating range of the first heat unit;
the supplying step further comprising the first heat unit cooling down at least part of the heat transfer fluid to a temperature within the efficient operating range of the additional heat unit; and
supplying the heat transfer fluid from the first heat unit to the additional heat unit.

15. A system for utilizing heat in a plant or animal growing device, comprising:
a fluid circuit including a pump and forming a closed fluid loop, wherein the pump is adapted to circulate heat transfer fluid through the fluid circuit;
a heat source adapted to add heat to the heat transfer fluid in the fluid circuit; and
a heat unit including a thermal desalination unit adapted to be heated by the heat transfer fluid in the fluid circuit,
wherein at least one additional heat unit is connected between and in serial arrangement with the heat source and the thermal desalination unit before or after the heat unit.

16. The system according to claim 15, wherein the additional heat unit includes a heating device of a medium of the plant or animal growing device, and wherein the additional heat unit is disposed between an outlet of the thermal desalination unit and an inlet of the heat source.

17. The system according to claim 16, wherein the heating device includes a crop heating device and/or a space heating device of a greenhouse.

18. The system according to claim 15, wherein the additional heat user includes a salt production device for producing salt from brine created in the thermal desalination unit.

19. The system according to claim 18, wherein the salt production device includes a salt pond.

20. The system according to claim 15, wherein the additional heat user includes a steam cycle machine, and wherein the additional heat unit is disposed between an outlet of the heat source and an inlet of the thermal desalination unit.

21. The system according to claim 20, wherein the steam cycle machine includes an organic rankine cycle machine.

22. The system according to claim 15, further comprising a heat buffer having a fluid inlet and at least one fluid outlet, wherein the fluid inlet is in direct fluid communication with the fluid circuit, and the at least one fluid outlet is in direct fluid communication with a fluid inlet of the heat unit and/or of the at least one additional heat unit.

23. The system according to claim 22, wherein the heat buffer includes a vertical tank, and wherein the vertical tank includes:
the fluid inlet; and
at least one heat transfer fluid take-off outlet disposed at a height between a top end of the vertical tank and a bottom end of the vertical tank, wherein the at least one heat transfer fluid take-off outlet is in direct fluid communication with the fluid circuit, wherein the height between the top end of the vertical tank and the bottom end of the vertical tank is selected such that a temperature of the heat transfer fluid at a respective one of the at least one heat transfer fluid take-off outlet is equal to or approximate to a temperature of the heat transfer fluid in a respective heat unit at a location where the heat transfer fluid from the respective take-off outlet is added to the fluid through the respective heat unit.

24. The system according to claim 15, wherein the heat source includes a solar driven heat source.

25. A greenhouse, comprising the system according to claim 15.

26. The system according to claim 15, wherein the additional heat unit includes a heating device of a medium of the plant or animal growing device, a salt production device for producing salt from brine created in the thermal desalination unit, and/or a steam cycle machine.

27. The system according to claim 26, wherein at least part of the heat transfer fluid is temporarily storable in a heat buffer for later use in at least one of the heat units, wherein the heat buffer includes a vertical tank, and wherein the vertical tank includes:
a fluid inlet disposed at a top end of the vertical tank and connected to an outlet of the heat source;
at least one heat transfer fluid take-off outlet disposed at a bottom end of the vertical tank and connected to an inlet of the heat source; and at least one fluid outlet connected to an inlet of a respective additional heat unit.

28. The system according to claim 15, the heat unit having an efficient operating range;

the additional heat unit having an efficient operating range;

wherein, if the additional heat unit is connected before the heat unit, heating, via the heat source, the heat transfer fluid to a temperature within the efficient operating range of the additional heat unit;

supplying heat from the heat transfer fluid to the additional heat unit, the additional heat unit cooling down at least part of the heat transfer fluid to a temperature within the efficient operating range of the heat unit; and supplying the heat transfer fluid from the additional heat unit to the heat unit.

29. The system according to claim 15, the heat unit having an efficient operating range;

the additional heat unit having an efficient operating range;

wherein, if the additional heat unit is connected after the heat unit, the heating step further comprising heating, via the heat source, the heat transfer fluid to a temperature within the efficient operating range of the heat unit;

the supplying step further comprising the first heat unit cooling down at least part of the heat transfer fluid to a temperature within the efficient operating range of the additional heat unit; and supplying the heat transfer fluid from the heat unit to the additional heat unit.

\* \* \* \* \*